(12) United States Patent
Nevison

(10) Patent No.: US 9,033,035 B2
(45) Date of Patent: May 19, 2015

(54) METHOD FOR FRACTURING A FORMATION USING A FRACTURING FLUID MIXTURE

(75) Inventor: Grant W. Nevison, Bragg Creek (CA)

(73) Assignee: Millennium Stimulation Services, Ltd., Calgary (CA)

( * ) Notice: Subject to any disclaimer, the term of this patent is extended or adjusted under 35 U.S.C. 154(b) by 78 days.

(21) Appl. No.: 13/979,808

(22) PCT Filed: Oct. 3, 2011

(86) PCT No.: PCT/CA2011/001112
§ 371 (c)(1),
(2), (4) Date: Sep. 13, 2013

(87) PCT Pub. No.: WO2012/097424
PCT Pub. Date: Jul. 26, 2012

(65) Prior Publication Data
US 2013/0341010 A1    Dec. 26, 2013

Related U.S. Application Data

(60) Provisional application No. 61/433,441, filed on Jan. 17, 2011.

(51) Int. Cl.
*E21B 43/16* (2006.01)
*E21B 43/26* (2006.01)
(Continued)

(52) U.S. Cl.
CPC .............. *E21B 43/26* (2013.01); *E21B 43/267* (2013.01); *E21B 43/168* (2013.01); *E21B 21/062* (2013.01); *C09K 8/62* (2013.01)

(58) Field of Classification Search
CPC ..... E21B 43/26; E21B 43/267; E21B 43/168; E21B 21/062; E21B 49/00; C09K 8/62
USPC .......... 166/308.1, 308.2, 308.3, 308.4, 308.5, 166/208.6, 250.21, 250.1
See application file for complete search history.

(56) References Cited

U.S. PATENT DOCUMENTS

| 3,063,499 A | 11/1962 | Allen |
| 3,170,517 A | 2/1965 | Graham et al. |

(Continued)

FOREIGN PATENT DOCUMENTS

| CA | 1047393 | 1/1979 |
| CA | 2721488 A1 | 12/2009 |

(Continued)

OTHER PUBLICATIONS

Canadian Intellectual Property Office; International Search Report & Written Opinion for PCT/CA2011/001114; Jan. 6, 2012; Gatineau, Quebec, CA.

(Continued)

*Primary Examiner* — Yong-Suk (Philip) Ro
(74) *Attorney, Agent, or Firm* — Jeffrey L. Wendt; The Wendt Firm, P.C.

(57) ABSTRACT

A method for fracturing a formation in a reservoir uses a fracturing fluid mixture comprising natural gas and a base fluid. The method comprises: determining certain reservoir conditions of the reservoir comprising the formation; selecting at least one desired behavior of the fracturing fluid mixture during a fracturing operation in the formation under the determined reservoir conditions; determining properties of the fracturing fluid mixture required to achieve the selected at least one behavior, preparing the fracturing fluid mixture having the determined properties; and injecting the fracturing fluid mixture into the reservoir under the determined reservoir conditions, such that the mixture exhibits the desired behavior during the fracturing operation. The determined properties include a mole fraction of natural gas in the mixture.

22 Claims, 10 Drawing Sheets

(51) Int. Cl.
*E21B 43/267* (2006.01)
*E21B 21/06* (2006.01)
*C09K 8/62* (2006.01)

(56) References Cited

U.S. PATENT DOCUMENTS

| | | | |
|---|---|---|---|
| 3,664,422 A | | 5/1972 | Bullen |
| 3,822,747 A | | 7/1974 | Maguire, Jr. |
| 4,417,989 A | * | 11/1983 | Hunter .......................... 507/269 |
| 5,653,287 A | | 8/1997 | Wilson et al. |
| 5,674,816 A | | 10/1997 | Loree |
| 6,302,209 B1 | | 10/2001 | Thompson, Sr. et al. |
| 2006/0065400 A1 | | 3/2006 | Smith |
| 2007/0204991 A1 | | 9/2007 | Loree et al. |
| 2008/0277115 A1 | | 11/2008 | Rediger et al. |
| 2009/0183874 A1 | | 7/2009 | Fordyce et al. |
| 2009/0301719 A1 | | 12/2009 | Bull et al. |
| 2010/0044049 A1 | | 2/2010 | Leshchyshyn et al. |

FOREIGN PATENT DOCUMENTS

| | | |
|---|---|---|
| CA | 2639539 A1 | 3/2010 |
| CA | 2649203 A1 | 6/2010 |
| WO | WO2010/025540 A1 | 3/2010 |
| WO | WO2010/130037 A1 | 11/2010 |
| WO | WO2011/000089 A1 | 1/2011 |

OTHER PUBLICATIONS

Canadian Intellectial Property Office; International Search Report & Written Opinion for PCT/CA2011/001113; Jan. 10, 2012; Gatineau, Quebec, CA.

Canadian Intellectual Property Office; International Preliminary Report on Patentability for PCT/CA2011/001113; Jun. 21, 2012; Gatineau, Quebec, CA.

Canadian Intellectual Property Office; International Preliminary Report on Patentability for PCT/CA2011/001114; Jun. 21, 2012; Gatineau, Quebec, CA.

Canadian Intellectual Property Office; International Search Report & Written Opinion for PCT/CA2011/001112; Jan. 11, 2012; Gatineau, Quebec, CA.

Canadian Intellectual Propert Office; International Preliminary Report on Patentability for PCT/CA2011/001112; Jun. 21, 2012; Gatineau, Quebec, CA.

United States Patent and Trademark Office; Non-Final Office Action for U.S. Appl. No. 13/979,816 issued Nov. 24, 2014; Alexandria, VA; US.

United States Patent and Trademakr Office; Non-Final Office Action for U.S. Appl. No. 13/979,823 issued Nov. 28, 2014; Alexandria, VA; US.

* cited by examiner

FIGURE 5     59 API Hydrocarbon Servicing Fluid with 80 mol% Methane

METHOD FOR FRACTURING A FORMATION USING A FRACTURING FLUID MIXTURE

RELATED APPLICATIONS

This application claims the benefit of U.S. provisional application No. 61/433,441 filed on Jan. 17, 2011 and incorporates the entirety of that application by reference.

FIELD OF THE INVENTION

This invention relates generally to a method of fracturing a formation using a fracturing fluid mixture.

BACKGROUND

Hydraulic fracturing is a common technique used to improve production from existing wells, low rate wells, new wells and wells that are no longer producing. Fracturing fluids and fracture propping materials are mixed in specialized equipment then pumped through the wellbore and into the subterranean formation containing the hydrocarbon materials to be produced. Injection of fracturing fluids that carry the propping materials is completed at high pressures sufficient to fracture the subterranean formation. The fracturing fluid carries the propping materials into the fractures. Upon completion of the fluid and proppant injection, the pressure is reduced and the proppant holds the fractures open. The well is then flowed to remove the fracturing fluid from the fractures and formation. Upon removal of sufficient fracturing fluid, production from the well is initiated or resumed utilizing the improved flow through the created fracture system. In some cases, such as recovering natural gas from coal bed methane deposits, proppants are not applied and the simple act of fracturing the formation suffices to provide the desired improvement in production. Failure to remove sufficient fracturing fluid from the formation can block the flow of hydrocarbon and significantly reduce the effectiveness of the placed fracture.

Selection of the fracturing fluid is important and dependent upon the objectives of, and expectations from, the treatment. A properly selected fluid will be cost effective, capable of being mixed and pressurized at surface, reliably carry proppant into the fractures, minimize damage and blockage in the pores of the formation, be readily handled at surface during recovery and minimize environmental impact of the overall operation. Selection of a fracturing fluid to best meet these sometimes conflicting requirements is difficult and care must be taken. To best meet these requirements over the wide range of situations and needs, many fracturing fluids and fracturing fluid mixtures have been disclosed to complete hydraulic fracturing, predominately based on water and hydrocarbon fluids with and without addition of a gas phase such as nitrogen or carbon dioxide.

The use of nitrogen or carbon dioxide with oil or water based fracturing fluids can provide a range of benefits. Presence of these gases improves or quickens fracturing fluid removal from the formation such that better effectiveness of the fracturing treatment is achieved. Additionally, these gases reduce the density of the base fracturing fluid allowing improved flow along the wellbore, again improving or quickening fracturing fluid removal. Interactions between the nitrogen or carbon dioxide and the base fracturing fluid can alter the physical properties of the base fluid including reducing the mixture viscosity, minimizing relative permeability effects and lowering surface tension. These effects result in improved fracturing fluid mobility within the formation pores, improved recovery of the fracturing fluids and superior production. In the case of hydrocarbon based fluids, the nitrogen or carbon dioxide may be less expensive and provide a cost effective volume substitution thereby lowering the cost of the treatment. Water, though often inexpensive to acquire, may be subject to significant costs for disposal of the recovered fluid and can have a negative environmental impact associated with their consumption, handling, recycling or disposal once recovered. Again nitrogen or carbon dioxide can provide benefit by reducing the volume of fluid applied, recovered and needing disposal.

However, the use of nitrogen or carbon dioxide based fracturing fluids can have detrimental effects on the hydraulic fracturing process. During fracture fluid recovery, nitrogen or carbon dioxide contaminate the natural gases produced, and without processing to remove the contamination, need to be flared or vented until the concentration of the fracturing gases in the well production fluid stream is sufficiently reduced that the produced well stream can be commercialized. Flaring and venting of the natural gas component during this period wastes this stream while is also environmentally damaging.

Carbon dioxide is chemically active in water and hydrocarbon based fluids. Solution of carbon dioxide in water forms carbonic acid requiring alterations to the viscosity developing chemicals often added. Further, the increased water acidity can interact with minerals in the formation resulting in damage and reduced effectiveness of the fracturing treatment. Upon recovery, the formed carbonic acid also promotes corrosion in surface equipment and pipelines. In hydrocarbon based fluids the addition of carbon dioxide impairs the effectiveness of the viscosity developing chemicals and may result in poor performance of fluid for creating the fractures and carrying the proppant into the fractures. Nitrogen is much more inert than carbon dioxide in water and hydrocarbon based liquids, however is gasified prior to injection and often results in reduced fluid hydrostatic pressures, increased injection pressure at surface and additional equipment or altered wellbore design to accept the higher injection pressures. Further, the source of the nitrogen or carbon dioxide is often remote from the well and suitable supply of these gases can make their application too expensive for good well economics. This is particularly true where it is necessary to economically generate multiple large fracture networks that are needed to effectively stimulate less prolific reservoirs such as tight gas and shale gas. With these challenges, the industry needs better solutions to maximize production from oil and gas formations, reduce or eliminate water use and eliminate venting and flaring. The solutions must be cost effective and minimally disturbing to allow quick and effective implementation and adoption.

SUMMARY

According to one aspect of the invention, there is provided a method of fracturing a formation in a reservoir using a fracturing fluid mixture comprising natural gas and a base fluid. The method comprises the following steps: determining certain reservoir conditions of the reservoir comprising the formation; selecting at least one desired behaviour of the fracturing fluid mixture during a fracturing operation in the formation under the determined reservoir conditions; determining properties of the fracturing fluid mixture required to achieve the selected at least one behaviour, wherein the determined properties includes a composition of base fluid in the mixture and a mole fraction of natural gas in the mixture; preparing the fracturing fluid mixture having the determined properties; and injecting the fracturing fluid mixture into the reservoir under the determined reservoir conditions, such that the mixture exhibits the desired behaviour during the fracturing operation. The reservoir conditions can comprise: reservoir pressure, reservoir temperature, fracturing pressure, and recovery pressure. The selected desired behaviour of the fracturing fluid mixture can be selected from the group consisting of: phase behaviour, interfacial tension, viscosity, and dissolved natural gas content. The determined properties of the fracturing fluid mixture can further comprise injection pressure and injection temperature.

The base fluid can comprise a hydrocarbon well servicing fluid. In such case, the hydrocarbon well servicing fluid can comprise one or both of alkane and aromatic based hydrocarbon liquids. The base fluid can further comprise one or both of a proppant and a viscosifier. Also, the natural gas can comprise methane or blends of methane with one or more gaseous hydrocarbons selected from the group consisting of ethane, propane, butane, and pentane, or blends of methane with one or more inert gases selected from the group consisting of carbon dioxide and nitrogen. The mole fraction of natural gas in the mixture can be between 4 mol % to 90 mol %.

When the selected desired behaviour is phase behaviour, the method in one aspect can further comprise determining a phase envelope of the fracturing fluid mixture having the selected mole fraction of natural gas in the mixture, and injecting the fracturing fluid mixture into the reservoir at a selected injection pressure and injection temperature such that the mixture comprises a liquid phase base fluid and a gaseous phase natural gas completely dissolved in the base fluid when the injected mixture enters the formation, and wherein at least some of the gaseous phase natural gas is not dissolved in the base fluid during recovery. In this aspect, the injection pressure and injection temperature can be selected so that the mixture is below the bubble point and above the dew point of the mixture when injected into the well. Alternatively, the injection pressure and injection temperature can be selected so that the mixture is above the bubble and dew points of the mixture when injected into the well.

When the selected desired behaviour is phase behaviour, the method can in another aspect further comprise determining a phase envelope of the fracturing fluid mixture having the selected mole fraction of natural gas in the mixture, and injecting the fracturing fluid mixture into the reservoir at a selected injection pressure and injection temperature such that the mixture comprises a liquid phase base fluid and a gaseous phase natural gas at least some of which is not dissolved in the base fluid when the injected mixture enters the formation and during recovery. In this aspect, the injection pressure and injection temperature can be selected so that the mixture is below the bubble point and above the dew point of the mixture when injected into the well.

When the selected desired behaviour is phase behaviour, and the method can in yet another aspect further comprise determining a phase envelope of the fracturing fluid mixture having the selected mole fraction of natural gas in the mixture, and injecting the fracturing fluid mixture into the reservoir at a selected injection pressure and injection temperature such that the mixture comprises a gaseous phase natural gas and a liquid phase base fluid fully dissolved in the natural gas when the injected mixture enters the formation and during recovery. In this aspect, the mole fraction of natural gas in the mixture can be between 80 mol % to 99 mol %, and the injection pressure and injection temperature can be selected so that the mixture is above the critical temperature when the mixture is injected into the well and at the reservoir temperature and reservoir pressure.

When the selected desired behaviour is phase behaviour, the method can in yet another aspect further comprise determining a phase envelope of the fracturing fluid mixture having the selected mole fraction of natural gas in the mixture, and injecting the fracturing fluid mixture into the reservoir at a selected injection pressure and injection temperature such that the mixture comprises a liquid phase base fluid and a gaseous phase natural gas fully dissolved in the base fluid when the injected mixture enters the formation, equilibrates to reservoir conditions and until recovery. After injection and before recovery, the well can be shut for a selected period of time.

When the selected desired behaviour is viscosity, the method can further comprise determining the required mole fraction of natural gas in the mixture for a desired viscosity of the mixture during the fracturing operation.

When the selected desired behaviour is surface tension, the method can further comprise determining the required mole fraction of natural gas in the mixture for a desired surface tension of the mixture during the fracturing operation.

When the selected desired behaviour is dissolved gas content, the method can further comprise determining the required mole fraction of natural gas in the mixture for a desired dissolved gas content of the mixture during the fracturing operation.

DETAILED DESCRIPTION OF EMBODIMENTS OF THE INVENTION

Figure 1:
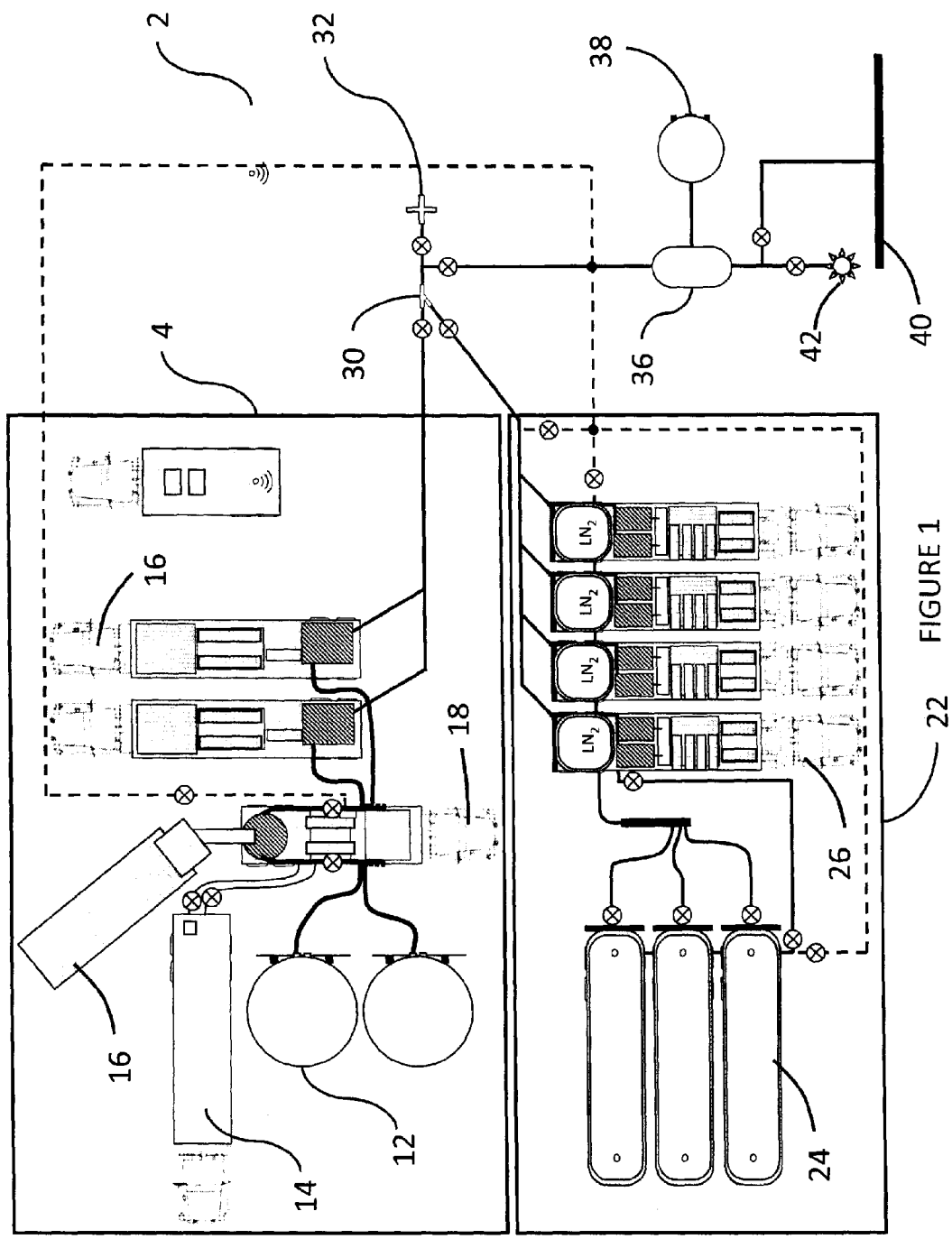
FIG. 1 is a schematic plan view of equipment for injecting a fracturing fluid mixture into a wellbore formation according to one embodiment of the invention.

The embodiments described herein relate to manipulating certain properties of a fracturing fluid mixture used during the formation fracturing operation to achieve certain behaviour of the mixture during a hydraulic fracturing operation.

The fracturing fluid mixture is used to hydraulically fracture underground formations in a reservoir, and involves mixing at least natural gas and a base fluid to form the fracturing fluid mixture then injecting the fracturing fluid mixture into a well that extends through the reservoir and to the formation to be fractured. The base fluid can comprise a hydrocarbon well servicing fluid, as well as a proppant and one or more viscosifiers to impart viscosity to the mixture. The molar ratio of natural gas in the mixture and the injection pressure and temperature can be manipulated so that the mixture has certain behaviours during the fracturing operation. These behaviours include a particular phase envelope, a certain capability to carry the proppant as well as one or more of the viscosifiers, a fraction of dissolved gas in the mixture, and the viscosity and surface tension of the mixture.

The base fluid can comprise a conventional hydrocarbon well servicing fluid comprised of alkane and aromatic based hydrocarbon liquids with or without a gelling agent and proppant. This base fluid is combined with a gaseous phase natural gas stream to form the fracturing fluid mixture. The natural gas component of the mixture is highly miscible in the hydrocarbon well servicing fluid. The resulting fracturing fluid mixture is injected into the underground formation at a selected pressure and temperature to create fractures or to enhance existing fractures. As will be discussed in greater detail below, the composition and quantity of the conventional hydrocarbon well servicing fluid along with the composition and quantity of natural gas, along with the surface injection pressure and temperature of the mixture are manipulated to create desired behaviours of the hydrocarbon fracturing fluid mixture during the fracturing operation, with the objective of improving performance of the fracturing operation.

As used in this disclosure, natural gas means methane ($CH_4$) alone or blends of methane with other gases such as other gaseous hydrocarbons which may be present in commercial supplies of natural gas. Natural gas is often a variable mixture of about 85% to 99% methane ($CH_4$) and 1% to 15% ethane ($C_2H_6$), with further decreasing components of propane ($C_3H_8$), butane ($C_4H_{10}$) and pentane ($C_5H_{12}$) with traces of longer chain hydrocarbons. Natural gas, as used herein, may also contain inert gases such as carbon dioxide and nitrogen in varying degrees. Natural gas is in a gaseous state at standard conditions of 60° F. and 1 atmosphere with a critical temperature near −82 C. As will be described in greater detail below, the natural gas will be above its critical temperature throughout the fracturing formation operation and thus will be in a gaseous phase throughout the operation.

As used in this disclosure, hydrocarbon well servicing fluids serving as the base fluid in the fracturing fluid mixture means any liquid hydrocarbon fluid containing alkanes and or aromatics that is applied to well servicing, stimulation or hydraulic fracturing. Compositions may include hydrocarbons or hydrocarbon blends having carbon chain lengths primarily from five carbons, $C_5$, through to thirty carbons, $C_{30}$. Preferentially, the hydrocarbon liquid will be of a composition such that the volatility will be suitable for completion of safe fracturing operations, such as those liquids with volatility below a Reid Vapor pressure of 2 psi. Alternatively, higher Reid Vapor Pressure liquids may be applied; however special equipment or procedures may be required for safe application.

Figure 2:
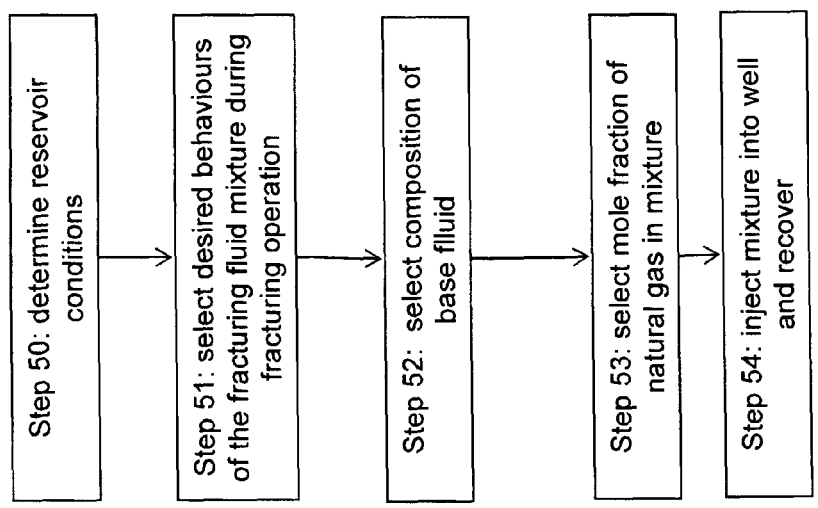
FIG. 2 is a flowchart illustrating steps for a method of fracturing a formation using the fracturing fluid mixture and the equipment shown in FIG. 1.

The embodiments described herein utilize formation fracturing equipment 2 as shown in FIG. 1 to carry out the formation fracturing method as depicted in FIG. 2.

More particularly, FIG. 1 illustrates one configuration of formation fracturing equipment 2 for applying and recovering a natural gas and hydrocarbon well servicing fluid mixture in a closed system fracturing operation. The formation fracturing equipment 2 includes the following well servicing preparing and pressurizing equipment 4: Frac liquid tanks 12 contain the hydrocarbon well servicing fluid (base fluid), a chemical addition unit 14 contains and applies viscosifying chemicals while a proppant storage unit 16 contains and applies proppant needed for the operation. The well servicing fluid, viscosifying chemicals, and proppant are combined within a fracturing blender 18 to form a prepared well servicing fluid then fed to fracturing pumpers 16 where the prepared well servicing fluid is pressured to fracturing conditions.

The formation fracturing equipment also includes the following natural gas preparation equipment 22: Mobile storage vessels 24 store the natural gas as liquefied natural gas (LNG). LNG fracturing pumpers 26 pressurize the LNG to fracturing conditions, and then heat the LNG to a desired application temperature. The formation fracturing equipment 2 also includes components 30 for combining the prepared well servicing fluid with the gaseous natural gas stream to form the fracturing fluid mixture and subsequently directing this mixture to the wellhead 32. The combined fluids then travel down the wellbore and into the formation to fracture the interval. Upon completing the fracturing treatment and beginning recovery of the fracturing fluids, the wellhead flow is directed from the wellhead to a flow separator 36. A gas-liquid separator 36 separates the recovered gas and liquid streams. The recovered liquids, including the hydrocarbon well servicing fluid and produced native reservoir liquids, are directed to a liquids recovery tank 38. Liquids recovery may or may not involve a tank; rather they can be directed to a liquids suitable pipeline (not shown) for processing should that facility exist. The recovered gases, including the applied natural gas and produced native reservoir gases, are directed to a gas pipeline 40, where they are directed to a facility (not shown) for processing and sale. In this or a similar manner, an environmentally closed fracturing system can be created and applied permitting hydraulic fracturing without water, venting or flaring 42.

FIG. 2 shows a series of steps carried out by a formation fracturing operation that are common to each embodiment. At step 50, the reservoir conditions are determined, i.e. the temperature and pressure of the reservoir comprising the formation is determined ("reservoir temperature" and "reservoir pressure"), as well as the fracturing pressure required to fracture the formation ("fracturing pressure") and the recovery pressure required to recover fluids from the formation. At step 51, the desired behaviour(s) of the fracturing fluid mixture during the fracturing operation are selected, and then certain properties of the fracturing fluid mixture are determined that are required to achieve these selected behaviour(s) during the fracturing operation. The selected behaviour(s) include: phase behaviour, amount of dissolved gas, reservoir phase fractions, viscosity, and surface tension. The determined properties required to achieve these selected behaviours include: composition of the fracturing fluid mixture, injection pressure, and injection temperature.

At step 52, the composition of the base fluid is selected, and at step 53 the mole fraction of natural gas in the mixture is selected. At step 54, the fracturing fluid mixture is prepared having the selected base fluid and the selected mole fraction of natural gas in the mixture. At step 55, the prepared fracturing fluid mixture is injected into a well of the reservoir at the selected temperature and the selected pressure such that the mixture has selected behaviour(s) during the fracturing (injection) and recovery steps of the fracturing operation.

As will be discussed below, there are at least four different embodiments of this method, wherein the selected behaviour is the phase behaviour of the mixture at the fracturing and recovery stages of the fracturing process. A first embodiment involves selecting the composition of the fracturing fluid mixture and the injection pressure and temperature such that the mixture is in a liquid-like phase during the fracturing step of the operation and in two phases during the recovery step of the operation. A second embodiment involves selecting the composition of the fracturing fluid mixture and the injection pressure and temperature such that the mixture is in two phases throughout the fracturing operation. A third embodiment involves selecting the composition of the fracturing fluid mixture and the injection pressure and temperature such that the mixture is in a gaseous phase throughout the operation, and a fourth embodiment involves selecting the composition of the fracturing fluid mixture and the injection pressure and temperature such that the mixture is in a liquid phase throughout the operation until recovery. The first embodiment is the general application of the method, whereas the second and third embodiments are particularly useful for fracturing a shallow formation, formations with high capillary pressures causing liquid blocks, under saturated formations that tend to trap liquids, and low permeability formations that require high draw down to move liquids within the reservoir. The fourth embodiment is particularly useful when it is desired to shut in the well for a period of time before recovery.

Other embodiments relate to fracturing using a fracturing fluid mixture wherein one or more other behaviours of the mixture are selected during the fracturing operation. In a fifth embodiment, a fracturing fluid mixture can be prepared to achieve a certain viscosity during the fracturing operation. In a sixth embodiment, a fracturing fluid mixture can be prepared to achieve a certain surface tension during the fracturing operation. These embodiments will be described in further detail below.

Figure 3:
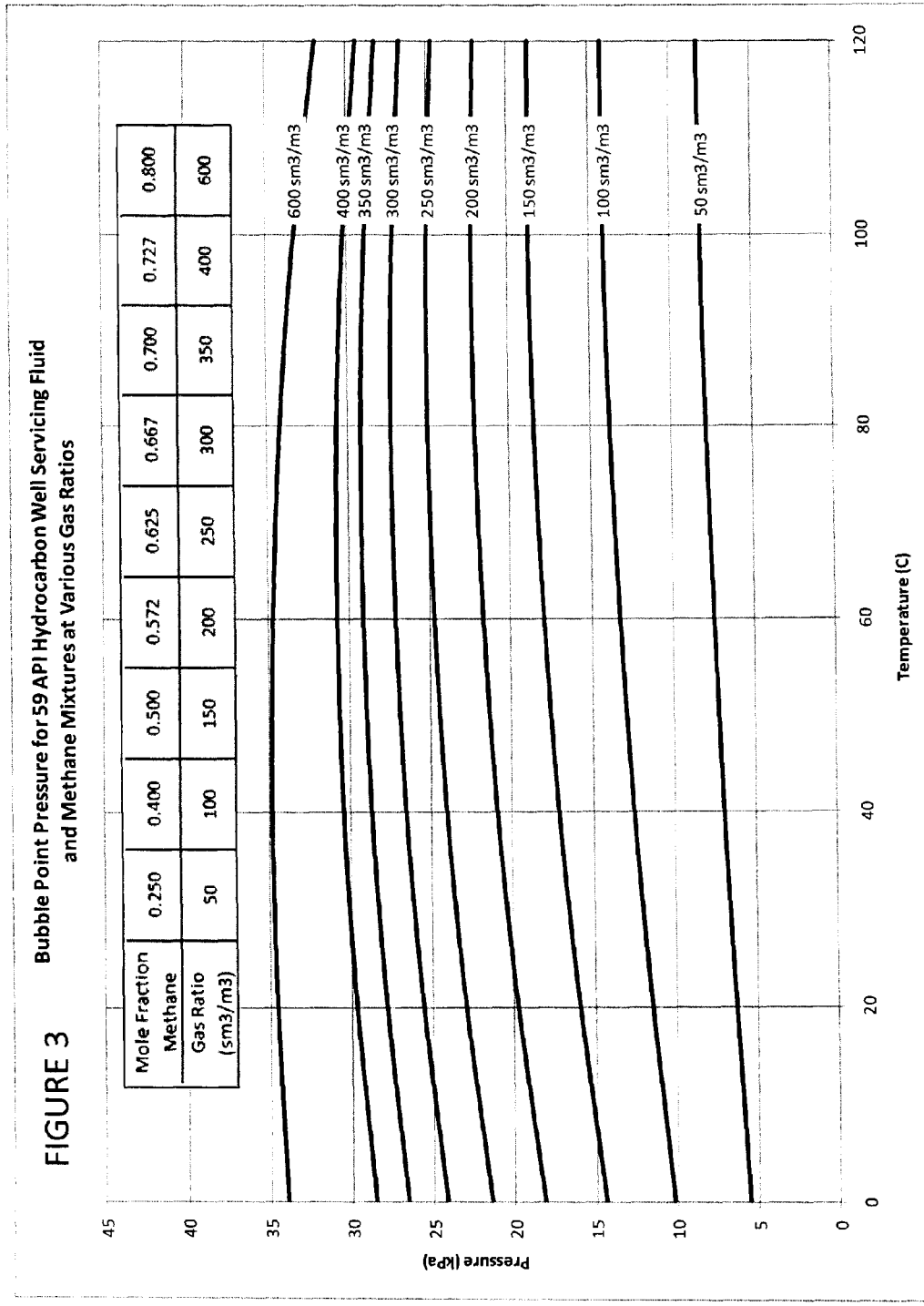
FIG. 3 is a graph of bubble point pressures for different compositions of the fracturing fluid mixture.

In order to achieve the desired phase and other behaviours of the fracturing fluid mixture during the fracturing and recovery steps of the fracturing operation, the operator must know the relationship between the desired behaviour and the mole fraction of natural gas in the mixture at a selected temperature and pressure; for example, when controlling the phase behaviour of the mixture during the fracturing operation is desired, the operation must know the phase envelope of the mixture, and in particular, must know the bubble pressure curve for that mixture. A unique set of bubble point pressure curves exist for each possible composition of the fracturing fluid mixture. The bubble point pressure of the fracturing fluid mixture can thus be selected by selecting the molar ratio of natural gas in the mixture. FIG. 3 is a chart illustrating the bubble point pressure of a known 59 API well servicing fluid for a range of methane contents over common application temperatures. Based upon a known reservoir temperature and pressure, and the known fracturing pressure, the maximum gas content to achieve a single phase fluid with the specific well servicing fluid can be determined, for example. Then, with a known injection temperature, friction pressure and determined properties of the combined natural gas and well servicing fluid at the selected gas content, the injection pressure at surface, and corresponding phase state down the tubulars of the well and into the reservoir can be determined.

If, at the initially selected natural gas content of the mixture, pressures remain above the bubble point through the injection conditions, the created fluid will provide single phase injection behaviour. Should the injection or tubular pressures be determined to fall below the bubble point curve at any point, then the selected gas content would need to be altered if a single phase mixture is desired and remain adjusted until such time as the resulting bubble point curve remains below the anticipated conditions. In this manner the selected natural gas content to achieve a liquid phase only injection condition for any hydrocarbon well servicing fluid can be selected, if such result is desired.

First Embodiment

Figure 4:
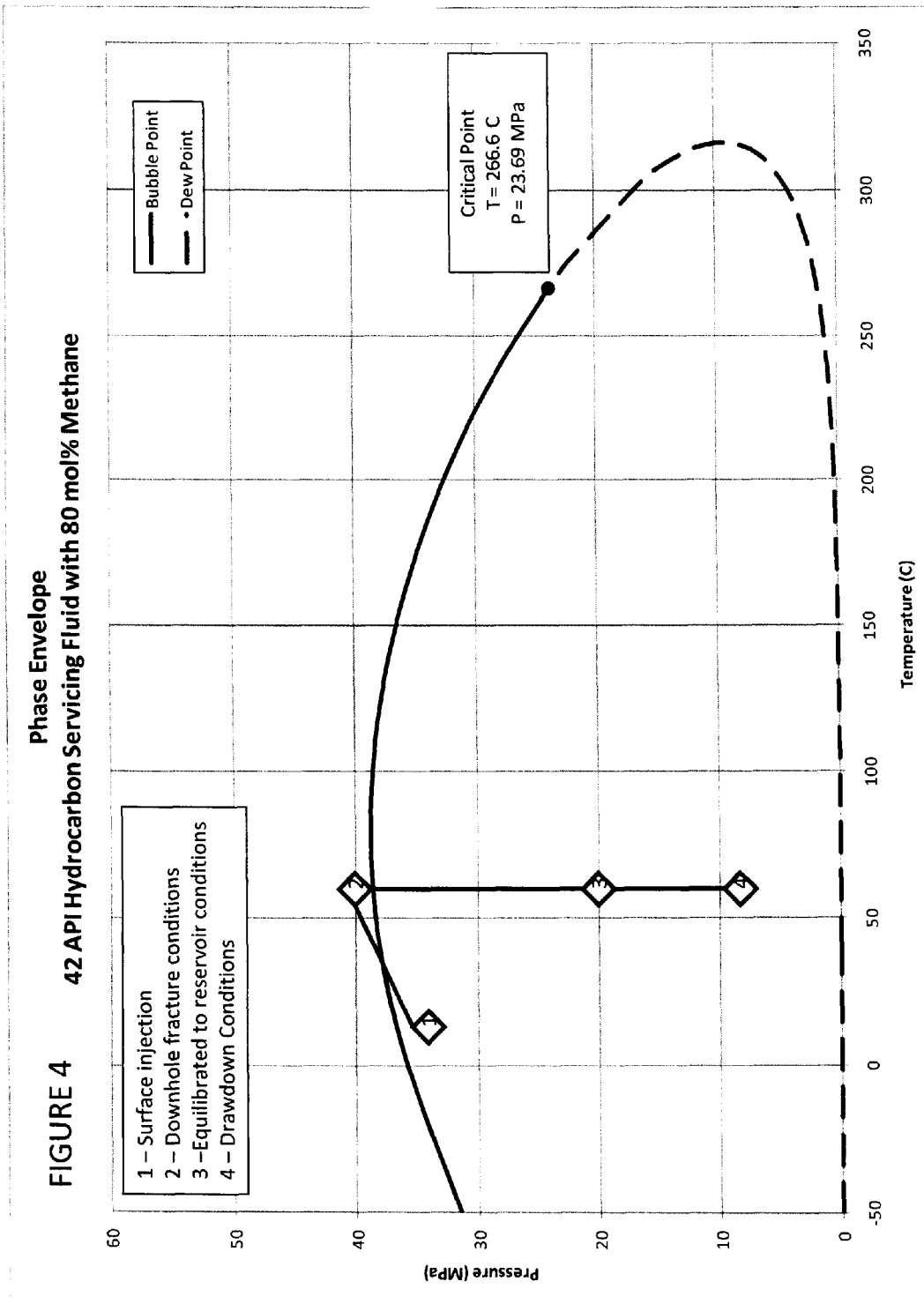
FIG. 4 is a graph of a phase envelope of a fracturing fluid mixture comprising 42 API hydrocarbon well servicing fluid with 80 mol % methane and the pressures and temperatures of this fracturing fluid mixture during the formation fracturing method according to a first embodiment.
Figure 5:
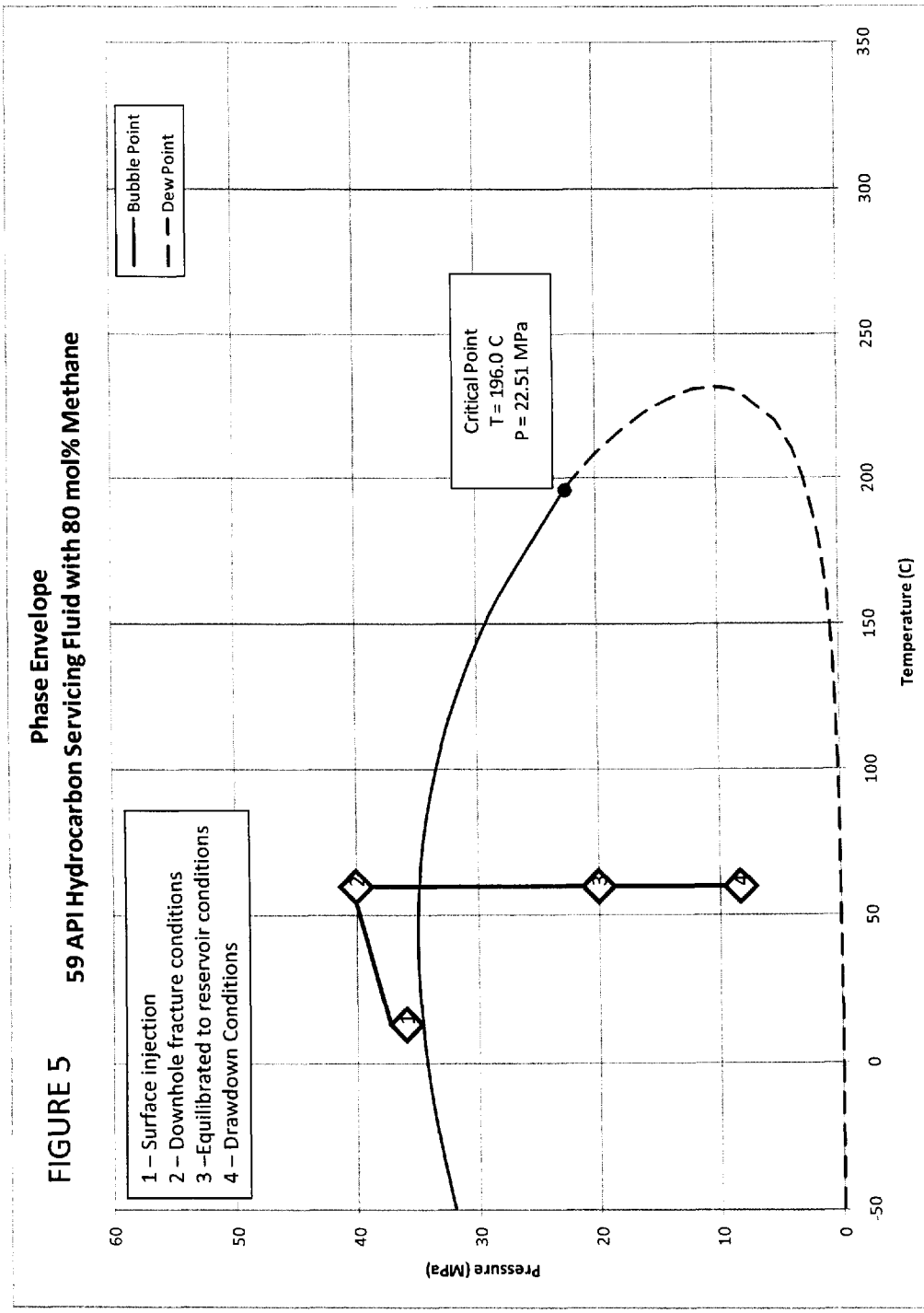
FIG. 5 is a graph of a phase envelope of a fracturing fluid mixture comprising 59 API hydrocarbon well servicing fluid with 80 mol % methane and the pressures and temperatures of this fracturing fluid mixture during the formation fracturing method according to the first embodiment.
Figure 6:
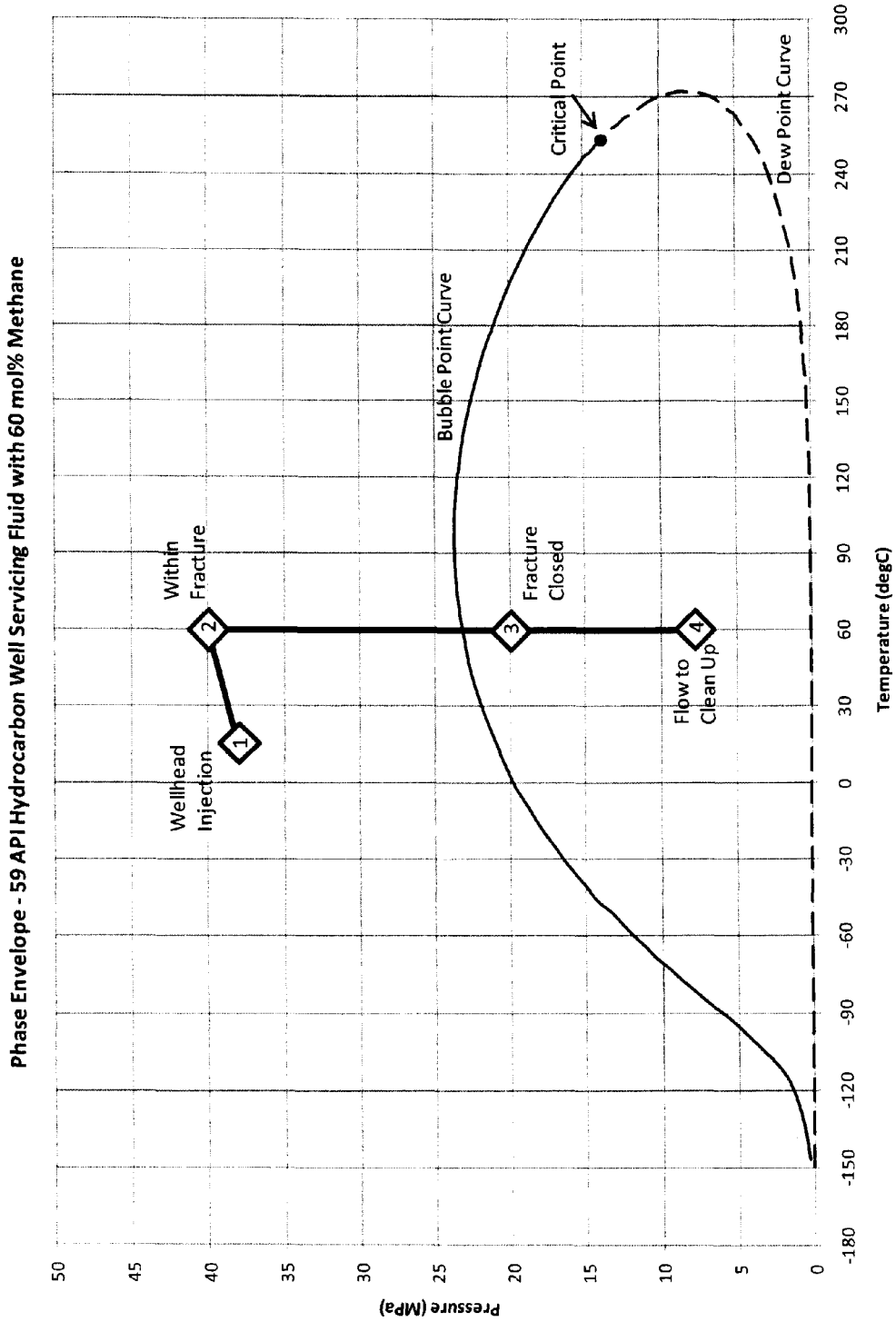
FIG. 6 is a graph of a phase envelope of a fracturing fluid mixture comprising 59 API hydrocarbon well servicing fluid with 60 mol % methane and the pressures and temperatures of this fracturing fluid mixture during the formation fracturing method according to the first embodiment.

Fracturing Fluid Mixture in Liquid Phase During Fracturing and in Two-Phases During Recovery According to a first embodiment of the formation fracturing method and referring to FIGS. 4 to 6, certain properties of a fracturing fluid mixture are manipulated so that the mixture is in a liquid phase when entering a fracture formation and during a fracturing step of the operation, and in two phases during a recovery step of the operation, i.e. after injection has ceased and during draw down.

In this embodiment, at common fracturing pressures, the natural gas is controlled to ensure it is completely dissolved within the conventional hydrocarbon well servicing fluid creating a high gas content, single phase liquid-like fluid mixture during injection. The natural gas content may be in the range of 5 mol % to 90 mol % within the mixture. The conventional hydrocarbon well servicing fluid may or may not be viscosified and may or may not contain proppant. The surface injection pressure and temperature are selected so that a single-phase liquid mixture exists upon mixing the natural gas with the well servicing fluid; this state is maintained down the wellbore, into the formation, the induced or existing fracture system and ultimately into the underground reservoir, and maintained during the fracturing step of the fracturing operation.

Maintaining the fracturing fluid in this single liquid-like phase state (hereinafter referred to simply as "liquid phase") during the fracturing step is desirable as this dense phase supports increased hydrostatic pressures during injection plus maintains a homogenous fluid for consistent viscosity development, reduced friction pressure, effective proppant transport and the creation of complex fractures. The natural gas content placed within the fracturing oil, the composition of the natural gas, the composition of the fracturing oil, or combinations thereof, are manipulated to maintain a single phase state during injection. Where a conventional hydrocarbon well servicing fluid with natural gas is injected into the underground reservoir during fracturing, the natural gas volume is sufficient to permit the combined fluid to exist in a single phase during injection; however upon ending injection and reducing the pressure of the mixture to reservoir or recovery conditions, the dissolved gas will evolve from the mixture to create a gas phase fraction within the contacted reservoir while retaining sufficient dissolved gas in the hydrocarbon servicing fluid to maintain a lowered liquid viscosity and surface tension. The combination of the gas phase fraction with the lowered liquid viscosity and the reduced surface tension creates a highly mobile system within the reservoir and created fracture system ensuring quick and high recovery factors for the fracturing liquids, a desirable state before the well is placed on production. Additionally, as the natural gas returns to the surface, it provides energy by expansion which further enhances removal of the liquid portion of the fracturing fluid by reducing the hydrostatic pressure within the wellbore. The reduced hydrostatic of the commingled natural gas with liquid will allow additional drawdown to be applied at the formation, thereby releasing a greater portion of the capillary trapped liquids, plus providing a larger pressure potential to increase flow rate.

FIGS. 4 and 5 are graphs of the phase envelope of 42 API and 59 API well servicing fluids combined with 80 mol % methane and illustrating the pressures and temperatures of the mixture during the fracturing operation. The ● on each figure denotes the critical point of the fluid mixture and hence the critical temperature. Injection of the natural gas and the hydrocarbon servicing fluid is within the industry practice at an injection temperature range of 10° C. to 20° C. though a wide range of injection temperatures can be applied if so desired. The combined natural gas and hydrocarbon well servicing fluids are injected into the wellbore at fracturing pressure at a selected temperature of about 10° C. At a given rate, tubular configuration, well depth and bottom hole fracturing pressure, a specific injection pressure will be required for each fluid, in this example at about 34 MPa and 36 MPa for the 42 API and 59 API fluids respectively. As can be seen on FIG. 4 as represented by Diamond 1, the surface injection pressure for the 42 API natural gas and hydrocarbon mixture is below the bubble point curve. Correspondingly, there is undissolved natural gas present, approaching 10% by volume which will create two-phase flow conditions and contribute to higher friction pressures, lower density and increased injection pressure. Further, free gas promotes higher velocities which may accelerate proppant erosion of the treating iron and the wellbore. FIG. 5, under similar conditions with a differing hydrocarbon servicing fluid composition, shows the injection pressure (Diamond 1) for the 59 API natural gas and hydrocarbon mixture to be above the bubble point curve creating the dense single phase liquid-like fluid that is desired for improved injection conditions with reliable viscosity development and proppant transport. For both cases, as the injected natural gas with hydrocarbon servicing fluid mixture travels down the wellbore and into the fracture system, the pressure increases due to hydrostatic while being reduced due to friction. Further, the fluid temperature increases due to heat transfer from the wellbore tubulars and underground formation and is expected to stabilize at a maximum near to or equal to the reservoir temperature.

The resulting condition is denoted as Diamond 2 on both FIGS. 4 and 5 with a presumed formation fracturing pressure of 40 MPa and the fluids at reservoir temperature, 60 C. FIG. 4 illustrates that at downhole fracture conditions the 42 API hydrocarbon-gas mixture is just above the bubble point such that a single liquid phase mixture is expected to exist prior to the fluid entering the fracture. FIG. 5 illustrates that the mixture is also above the bubble point under the downhole fracture conditions and that it remains in that state from injection at surface and through the wellbore into the underground formation. Again, upon ceasing injection, the pressure will decrease, and the injected fluid will equilibrate to reservoir pressure, presumed at 20 MPa in this example and denoted as Diamond 3 on FIGS. 4 and 5. The fluid temperature will remain at or near the reservoir temperature at 60 C. Under these conditions the fluids are well below the bubble point and into the two-phase region of the phase envelope. Of the injected fluid mixture, the evolved gas component for the 42 API and 59 API natural gas mixtures is determined to constitute a volume of approximately 56% and 62% respectively providing an immediate gas phase, a considerably reduced liquid volume and significantly reducing potential liquid blocking. Upon drawing down the pressure within the reservoir to recover the injected fluid and produce the well, the pressure is decreased to a presumed pressure of 8 MPa while again the fluids remain at or near reservoir temperature. This drawdown phase is denoted as Diamond 4 on FIGS. 4 and 5. In this instance the reduced pressure draws conditions further below the bubble point where additional gas is evolved from the hydrocarbon servicing fluid. The resulting gas phase volume is now determined to be at 82% for the 42 API natural gas hydrocarbon well servicing fluid mixture and 87% for the 59 API natural gas hydrocarbon well servicing fluid mixture. A very large reduction in liquid volume is achieved with a significantly reduced potential for liquid blocking.

FIG. 6 is a chart displaying the phase envelope for a fracturing fluid mixture comprising 60 mol % methane and a 59 API hydrocarbon well servicing fluid, and illustrates the pressures and temperatures of the mixture during the fracturing operation. Corresponding to the illustrated fracturing process is an example set of well fracturing conditions presented in Table 1. Further corresponding to the well fracturing conditions presented in Table 1 are the resulting exemplary fluid properties presented in Table 2.

At wellhead injection conditions, Diamond 1 in FIG. 6 and Point 1 in Table 2, the fracturing fluid mixture is well above the bubble point pressure and exists in the liquid phase at a density of 635 kg/m3. Given a base hydrocarbon well servicing fluid density of 742 kg/m3, 59 API, and the addition of natural gas at a ratio of 225 sm3/m3 liquid (0.6 mol frac methane), a density of 535 kg/m3 would result if the phases were immiscible; nearly a 20% improvement in hydrostatic. This correspondingly should reduce the wellhead injection pressure. Similarly, the lowered friction pressure achieved with a single phase fluid over a two phase fluid further should improve the wellhead injection pressure. In this case, with heating of this injected mixture due to heat transfer from the tubulars and the contacted formation during fracturing operations (reference Diamond 2 of FIG. 6 and Point 2 of Table 2), the resulting density decreases slightly. However the fluid mixture remains well above the bubble point and continues to exist as a liquid. Such improvements in density is theorized to contribute to successfully fracturing deep formations, formations with naturally high fracturing pressures and formations where high injections rates are desired. Maintaining the fluid mixture in the liquid state is also theorized to contribute to ensuring effective viscosifier function and suitable density for proppant transport and fracture creation.

Upon ceasing injection, the pressure should decrease, and the injected fluid should equilibrate to reservoir pressure, which is 20 MPa in this example and denoted as Diamond 3 on FIG. 6 and Point 3 on Table 2. Under these conditions the fluid is now below the bubble point and within the two-phase region of the phase envelope. Of the injected fluid, the evolved gas component is at approximately 15% by volume providing an immediate gas phase.

Upon drawing down the pressure within the reservoir to recover the injected fluid and produce the well, to an exemplary pressure of 8 MPa, the fluids are expected to remain at or near reservoir temperature (diamond 4 in FIG. 6 and point 4 in Table 2). The reduced pressure results in conditions further below the bubble point where additional gas is evolved from the hydrocarbon servicing fluid. The resulting gas phase is now determined to be over 66%. Loss of the natural gas saturation within the liquid causes the viscosity and interfacial tension to increase moderately, however the gas expansion is expected to provide a significant drive to move the reduced volume of remaining liquid through the formation, fractures and to the wellbore. Density of the combined gas and liquid phases is very low, at about 260 kg/m3, ensuring high mobility and ready flow up the wellbore to surface.

TABLE 1

WELL AND INJECTION PARAMETERS

| | |
|---|---|
| Fracturing Gradient = | 20 kPa/m |
| Well Depth = | 2,000 m |
| Reservoir Temperature = | 60 C. |
| Reservoir Pressure = | 20 MPa |
| Fracturing Pressure = | 40 MPa |
| WH Injection Pressure = | 38 MPa |
| Mole Fraction CH4 = | 0.6 |
| Frac Oil Gravity = | 59 API |
| Injection Gas Ratio = | 225 sm3/m3 |
| Total BH Rate = | 4.0 m3/min |
| Oil Rate = | 2.7 m3/min |
| Gas Rate = | 608 sm3/min |

TABLE 2

59 API HYDROCARBON WELL SERVICING FLUID WITH 60 MOL % METHANE FLUID PROPERTIES

| Point | Pressure (MPa) | Temp. (C.) | Vapor (vol frac) | Density (kg/m3) | | | Viscosity (cP) | | Interfacial Tension (dyne/cm) |
|---|---|---|---|---|---|---|---|---|---|
| | | | | Feed | Liquid | Vapor | Liquid | Vapor | |
| 1 | 38 | 15 | 0 | 635 | 635 | — | Gelled Liquid | | — |
| 2 | 40 | 60 | 0 | 600 | 600 | — | Gelled Liquid | | — |
| 3 | 20 | 60 | 0.152 | 530 | 598 | 147.5 | 0.19 | 0.020 | 2.8 |
| 4 | 8 | 60 | 0.665 | 259 | 669 | 52.2 | 0.30 | 0.014 | 11 |

Given a natural gas saturated hydrocarbon servicing fluid mixture at reservoir and draw down conditions, resulting properties of the remaining saturated liquid phase will be dependent upon the hydrocarbon servicing fluid applied. Gas in solution, evolved gas, the resulting gas volume fraction and the viscosity and interfacial tension will vary with the composition of the hydrocarbon servicing fluid. For example, well servicing fluids predominately containing lower carbon number components, $C_5$ through $C_{10}$, will provide lower viscosities and lower interfacial tensions than those well servicing fluids predominately containing higher carbon number components, $C_5$ through $C_{30}$. Testing of fracturing fluid mixtures with the formation cores samples can provide good insight as to the behavior needed to optimize recovery and ultimately production from the well. Evaluation of characteristics such as the resulting relative permeability and capillary pressures at various gas fractions can help set the optimum post-treatment fracturing fluid properties and hence the choice of hydrocarbon well servicing fluid and applied natural gas content.

Though these examples shown in FIGS. 4-6 are only three illustrations of a large number of possible natural gas and hydrocarbon well servicing fluid mixtures and pressure and temperature combinations, it is generally representative of conditions and the behaviours that can be achieved when properly applying mixtures of natural gas and hydrocarbon servicing fluids during hydraulic fracturing and subsequent recovery operations.

Second Embodiment

Fracturing Fluid Mixture in Two-Phases Throughout Fracturing Operation

According to a second embodiment, certain properties and behavior of a fracturing fluid mixture are manipulated so that the mixture is in two phase throughout the fracturing operation. This embodiment is particularly useful for fracturing a shallow formation, formations with high capillary pressures causing liquid blocks, under saturated formations that tend to trap liquids, and low permeability formations that require high draw down to move liquids within the reservoir.

In this embodiment, the relative content of the natural gas with the conventional hydrocarbon well servicing fluid is controlled to ensure the resulting mixture over saturates the conventional hydrocarbon well servicing fluid resulting in a two phase fracturing fluid mixture throughout the fracturing operation. The natural gas content may be in the range of 20% to 95% mole fraction within the mixture. The conventional hydrocarbon well servicing fluid may or may not be viscosified and may or may not contain proppant. The resulting two phase fracturing fluid mixture is comprised of the liquid phase of a gas-saturated conventional hydrocarbon well servicing fluid and a gas phase comprised of undissolved natural gas in equilibrium with the saturated hydrocarbon well servicing fluid. The two phase fracturing fluid mixture may exist upon mixing of the natural gas with the hydrocarbon well servicing fluid at surface injection pressure and temperature; this state is maintained down the wellbore, into the formation of an induced or existing fracture system and ultimately into the underground reservoir.

Creating the fracturing fluid mixture in a two-phase state can further reduce the liquid volume needed for the fracturing operation, thereby reducing the liquid volume potentially trapped within the formation and inhibiting native hydrocarbon recovery. Upon ending injection and reducing the pressure of the mixture to reservoir or recovery conditions, additional dissolved gas should evolve from the mixture to further increase the gas phase fraction within the contacted reservoir. The liquid phase should retain dissolved gas to promote a lowered liquid viscosity and lower surface tension as with the previous application. The combination of the increased gas phase fraction with the lowered liquid viscosity and the reduced surface tension is expected to create a highly mobile system within the reservoir and created fracture system and exhibit a low liquid content and high recovery factors for the fracturing liquids, which is a desirable state before the well is placed on production. Additionally, as the large component of natural gas is expected to return to the surface, it provides energy by expansion which is expected to further enhance removal of the liquid portion of the fracturing fluid by reducing the hydrostatic pressure within the wellbore. The significantly reduced hydrostatic of the commingled natural gas and liquid is expected to allow additional drawdown to be applied at the formation, thereby releasing a greater portion of capillary trapped liquids, plus providing a larger pressure potential to increase flow rate. Such theorized improvements are expected to contribute to successfully fracturing shallow formations, formations with potentially high capillary pressures causing liquid blocks, under saturated formations that tend to trap liquids, and low permeability formations that require high draw down to move liquids within the reservoir. Though the injection and proppant transport capabilities may not be as high as in a liquid phase mixture, the two-phase mixture is expected to be particularly adept at removing the treating fluids. The properties of the hydrocarbon well servicing fluid, the natural gas, and the composition of the natural gas and fracturing oil components are manipulated with the goal of significantly reducing the liquid volume placed within the reservoir, maximizing creation of a gas phase within the pores, fissures and fractures and minimizing the hydrostatic of the recovered fluid column.

Figure 9:
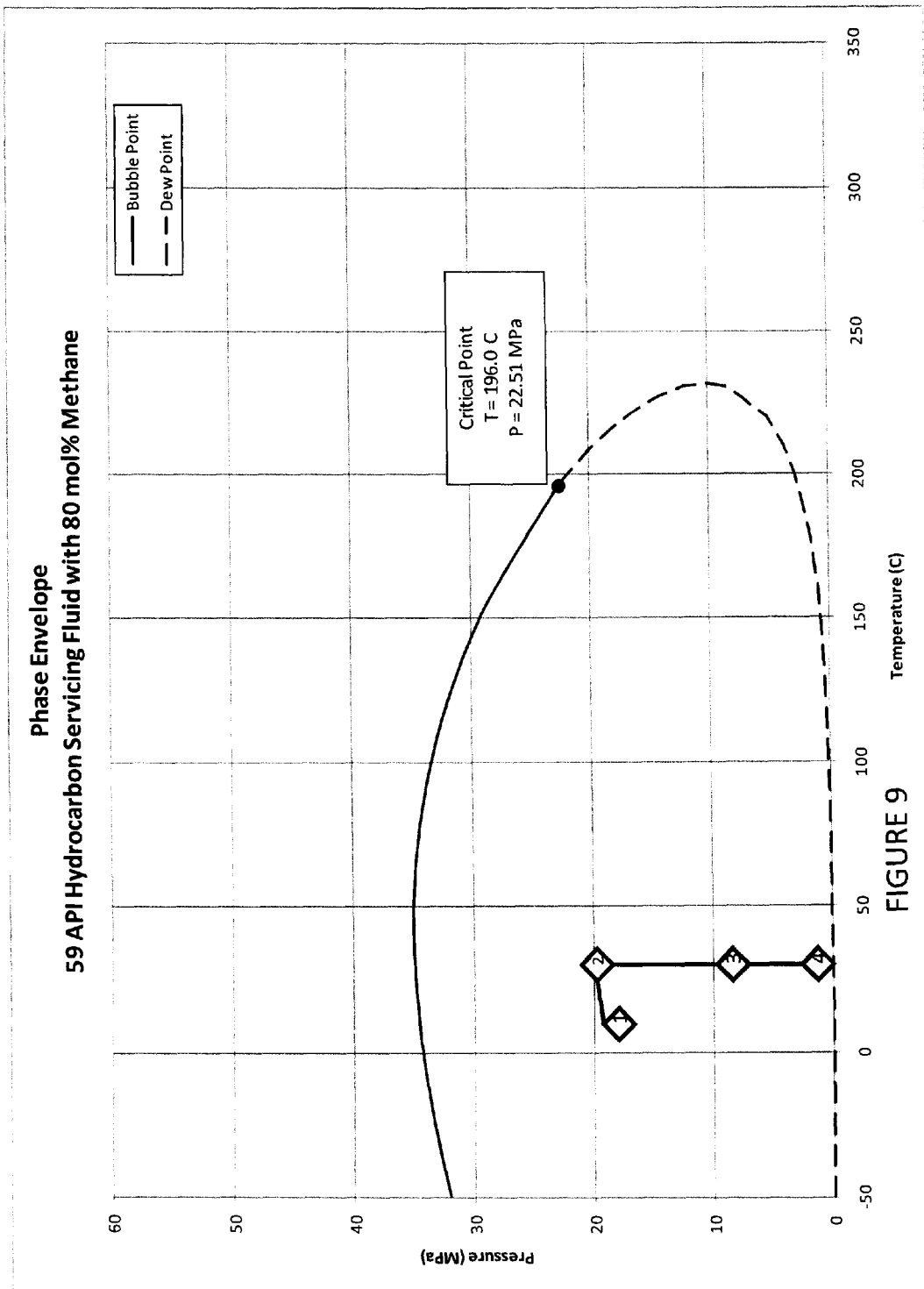
FIG. 9 is a graph of a phase envelope of a fracturing fluid mixture comprising 59 API hydrocarbon well servicing fluid with 80 mol % methane and the pressures and temperatures of this fracturing fluid mixture during the formation fracturing method according to a second embodiment.

FIG. 9 illustrates an exemplary application of this embodiment wherein the mixture comprises a 59 API well servicing fluid with 80 mol % methane. In this example, the maximum acceptable post-treatment volume fraction of liquid at reservoir conditions is 15% based upon laboratory testing with a 59 API hydrocarbon well servicing fluid. Other criteria such as a target recovery density, viscosity and interfacial tension may be specified for the fluid design constraint at any of the pressure and temperature conditions. Known application conditions are that of a 1,000 m well with a reservoir pressure of 8 MPa at a temperature of 35 C, and a bottom hole fracturing pressure of 20 MPa. The well will be flowed following the treatment at formation drawdown pressures as low as 2 MPa. Calculations and/or fluid testing indicates that a saturated mixture at reservoir conditions is achieved with a natural gas content of 0.28 mol fraction. Calculations determine that to create the target volume fraction of liquid, an additional 0.52 mol fraction of natural gas is required. The total natural gas content of the combined feed is the sum of the gas in solution plus the free gas to a required gas content of about 0.8 mole fraction.

FIG. 9 illustrates a fracturing operation with pressures of the fracturing fluid mixture below the bubble point. The reservoir conditions are illustrated as Diamond 3 and are shown to be well under the bubble point pressure. The liquid volume at these conditions is determined to be 14.8%, meeting the design criteria. The formation fracturing conditions are illustrated as Diamond 2 with a gas volume at 58% and the combined density at 354 kg/m3. Wellbore injection calculations for the proposed tubulars, injection temperature, gas content, hydrocarbon well servicing fluid at the proposed injection rate and application conditions is completed and an injection pressure of 18 MPa is determined. The injection pressure and temperature of 18 MPa and 15 C is shown on FIG. 9 as Diamond 1; the fracturing fluid mixture exists as a two-phase fluid at both the surface injection and formation fracturing conditions; injection and fracture conditions are under the bubble point curve. Calculations show the resulting gas volume at surface injection is 58.5% providing a density of 362.5 kg/m3. During recovery operations at the drawdown pressure of 2 MPa, the gas volume increases to over 96% with less than 4% liquid remaining in the reservoir. Density of the combined gas and liquid at drawdown pressure is 36.4 kg/m3 resulting in a very low hydrostatic in the wellbore.

Third Embodiment

Fracturing Fluid Mixture in Gaseous Phase Throughout Fracturing Operation

According to a third embodiment, certain properties and behavior of a fracturing fluid mixture are manipulated so that the mixture is in a gaseous phase throughout the fracturing process. This embodiment is particularly useful for fracturing very shallow formations, formations with very low reservoir pressures, formations with high capillary pressures causing liquid blocks, under-saturated formations that tend to trap liquids, and very low permeability formations that require high draw down to move liquids within the reservoir.

In this embodiment the relative content of the conventional hydrocarbon well servicing fluid content is greatly minimized in the mixture; the natural gas content may be in the range of 80% to 99% mole fraction within the mixture. The conventional hydrocarbon well servicing fluid may or may not be viscosified and may or may not contain proppant. This fracturing fluid mixture is comprised predominately of a gas phase, wherein the gaseous natural gas contains relatively minor quantities of conventional hydrocarbon well servicing fluid. This gas phase may be created upon mixing of the natural gas with the hydrocarbon based well servicing fluid at surface injection pressure and temperature; with this state maintained down the wellbore, into the formation, the induced or existing fracture system and ultimately into the underground reservoir.

Creating the fracturing fluid in a gas phase state is expected to substantially eliminate liquids needed for the fracturing operation thereby substantially eliminating the liquid volume potentially trapped within the formation and inhibiting native hydrocarbon recovery. The liquid phase hydrocarbon well servicing fluid is only applied to introduce and carry proppant into the natural gas injection stream and may or may not include viscosifiers used to carry proppant through the liquid handling equipment. As a gas phase fluid, the resulting fracturing fluid mixture is expected to exhibit only gas-like viscosities without any benefit derived from the added viscosifiers which are typically ineffective in gases. Under these conditions, proppant transport and fracture creation effectiveness are often poor and very high injection rates are usually applied to compensate. Upon ending injection and reducing the pressure of the mixture to reservoir or recovery conditions, the gas should expand and further increase the gas phase fraction within the contacted reservoir. The liquid phase should remain dissolved within the gas phase or form an inconsequential portion of the resulting volume.

The resulting gas phase is expected to be highly mobile within the reservoir and created fracture system with potentially no liquid content with substantially no trapped liquids to block production, which is a desirable state before the well is placed on production. Additionally, with predominately gas returning to surface the hydrostatic pressure within the wellbore is expected to be extremely low thus encouraging rapid and complete recovery of the applied fluids. Such theorized improvements are expected to contribute to successful fracturing of very low pressure formations, very shallow formations, very low pressure formations, formations with potentially high capillary pressures causing liquid blocks, under saturated formations that tend to trap liquids, and very low permeability formations that require high draw down to move liquids within the reservoir. Though the injection and proppant transport capabilities are not as high as in a liquid phase fracturing fluid mixture, this gaseous phase mixture is expected to be particularly adept at removing the treating fluids.

Figure 10:
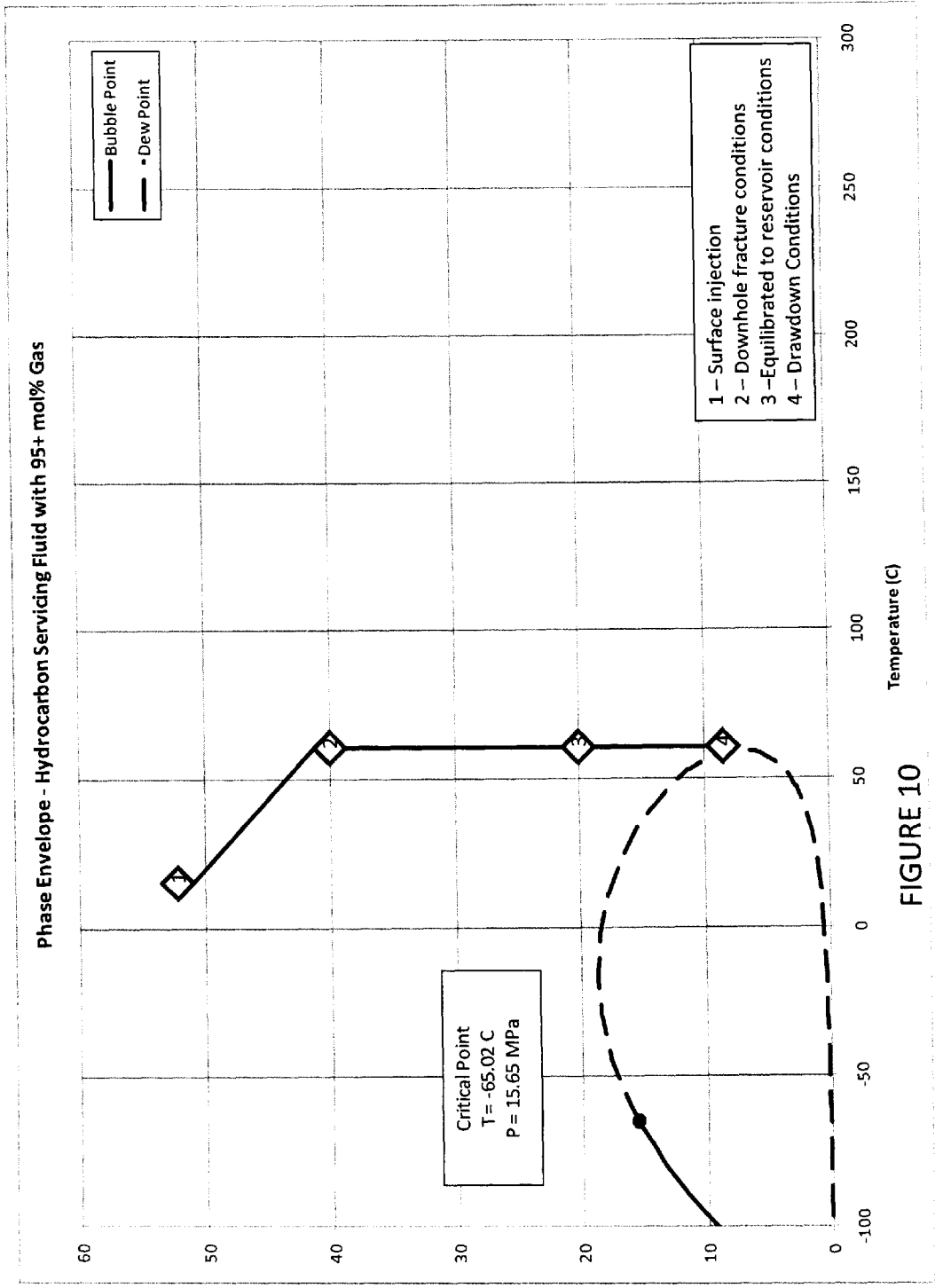
FIG. 10 is a graph of a phase envelope of a fracturing fluid mixture comprising a hydrocarbon well servicing fluid with 95+ mol % methane and the pressures and temperatures of this fracturing fluid mixture during the formation fracturing method according to a third embodiment.

FIG. 10 is a chart displaying the phase envelope for an exemplary high mol % hydrocarbon gas mixture with a hydrocarbon well servicing fluid and illustrates the pressures and temperatures of the mixture during the fracturing operation, where the injected mixture is above the critical temperature at injection and reservoir conditions. At the wellhead injection conditions (Diamond 1), the natural gas and hydrocarbon well servicing fluid mixture at 15° C. and 53 MPa are well above the critical temperature and as such exist in the gas phase and exhibit a density of 359 kg/m3. As the injected mixture travels down the wellbore and into the fracture system the pressure may decrease due to friction combined with the low hydrostatic, while the temperature of the gas increases due to heat transfer from the wellbore tubulars and underground formation, and is expected to stabilize at a maximum near to or equal to the reservoir temperature. This condition is denoted as Diamond 2 with a presumed formation fracturing pressure of 40 MPa and a reservoir temperature of 60 C. The fluid mixture remains well above the critical temperature and continues to exist in the gas phase, exhibiting a density of about 285 kg/m3. Upon ceasing injection, the pressure will decrease, and the injected fluid will equilibrate to reservoir pressure, presumed at 20 MPa in this example and denoted as Diamond 3 on FIG. 10. Under these conditions the fluid remains above the critical temperature and as a gas phase mixture with a density of 176 kg/m3. Upon reducing the pressure during drawdown to recover the injected fracturing mixture and place the well on production, drawdown applied to a presumed pressure of 8 MPa at the reservoir temperature of 60 C, the cricondentherm of the dew point envelope is approached as illustrated on FIG. 10 as Diamond 4. In this example, the conditions are such that the phase envelope is avoided and the mixture remains within the gas phase exhibiting a density of 68 kg/m3. In similar applications at high natural gas contents, variations in mixture composition or application conditions may result in intersection of the dew point envelope with minor volumes of liquid created, typically expected at less than 5%.

Fourth Embodiment

Fracturing Fluid Mixture in Liquid Phase at Reservoir Pressure and Temperature

According to a fourth embodiment, certain properties and behavior of a fracturing fluid mixture are manipulated so that the mixture is in a liquid phase at reservoir pressure and temperature, thereby permitting the well to be shut-in before recovery.

In this embodiment the fracturing fluid mixture comprises natural gas and a hydrocarbon well servicing fluid with the gas content controlled such that all applied natural gas remains in solution within the hydrocarbon based well servicing fluid at reservoir pressure and temperature, thus permitting the well to be shut-in for extended periods before recovery of the fracturing fluid without loss in effectiveness of the applied gaseous phase. In conventional operations, wells are often fracture stimulated where a largely insoluble included gas phase, e.g. nitrogen or carbon dioxide, is added to the liquid phase, an aqueous or hydrocarbon based fracturing fluid. Where recovery cannot begin immediately, such as when completing multiple fracture treatments on a horizontal well, the applied gas phase dissipates into the reservoir with time and becomes largely ineffective in assisting the recovery of associated fracturing liquids. In this embodiment, the liquid-like phase of the hydrocarbon well servicing fluid mixture permits the well to be shut-in for extended periods without loss of the benefits associated with a gas assist mechanism. The gas content is controlled with the hydrocarbon well servicing fluid composition to create a mixture that is just at or above the bubble point at reservoir conditions. At this state, all applied natural gas is dissolved within the hydrocarbon well servicing fluid at reservoir temperature and pressure. The gas can remain dissolved indefinitely or until the pressure is reduced for drawdown.

Fifth Embodiment

Fracturing Fluid Mixture Having Selected Viscosity During Fracturing Operation

Figure 7:
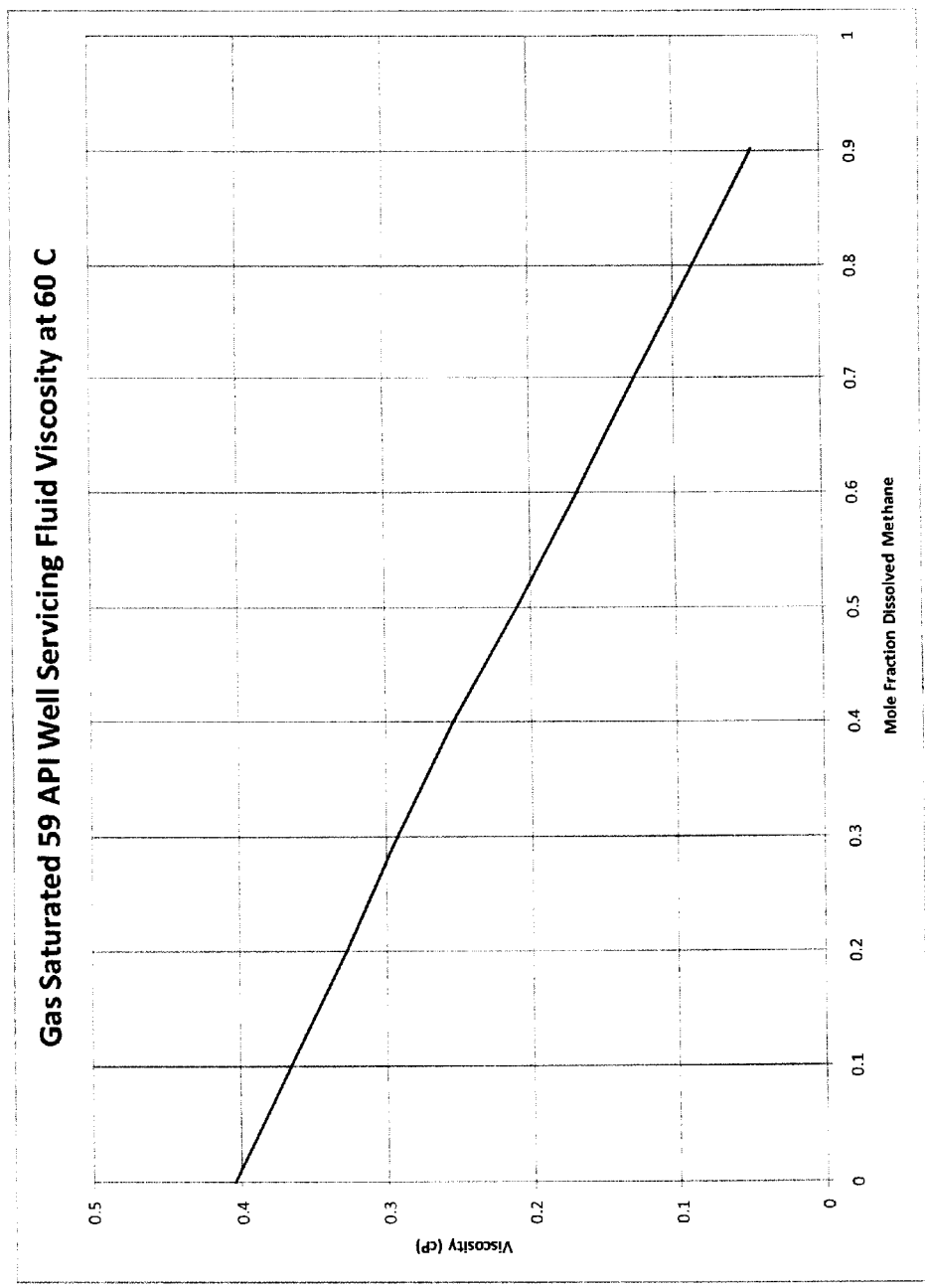
FIG. 7 is a chart displaying natural gas saturated viscosity of a 59 API hydrocarbon well servicing fluid for different compositions of the fracturing fluid mixture.

Referring to FIG. 7 and according to a fifth embodiment, the fracturing fluid mixture is prepared so that the mixture exhibits a selected viscosity during the fracturing operation. With a selected base fluid at a certain pressure and temperature, the relationship between the mixture's viscosity and the mole fraction of natural gas in the mixture can be determined. In the example shown in FIG. 7, a mixture comprising a base fluid of 59 API well servicing fluid with 0.53 mole fraction natural gas should have a liquid phase viscosity of 0.20 cP at 60° C., which is substantially lower viscosity than if the mixture did not have any dissolved gas (above 0.4 cP). Such lower viscosity is expected to promote an improved rate recovery of the well servicing fluid during draw down over convention well servicing fluids (i.e. without any dissolved natural gas).

The interfacial tension of the natural gas saturated hydrocarbon servicing fluid is also considerably reduced to about 2.8 dynes/cm compared to an estimated interfacial tension approaching 20 dynes/cm for the oil without dissolved natural gas.

Sixth Embodiment

Figure 8:
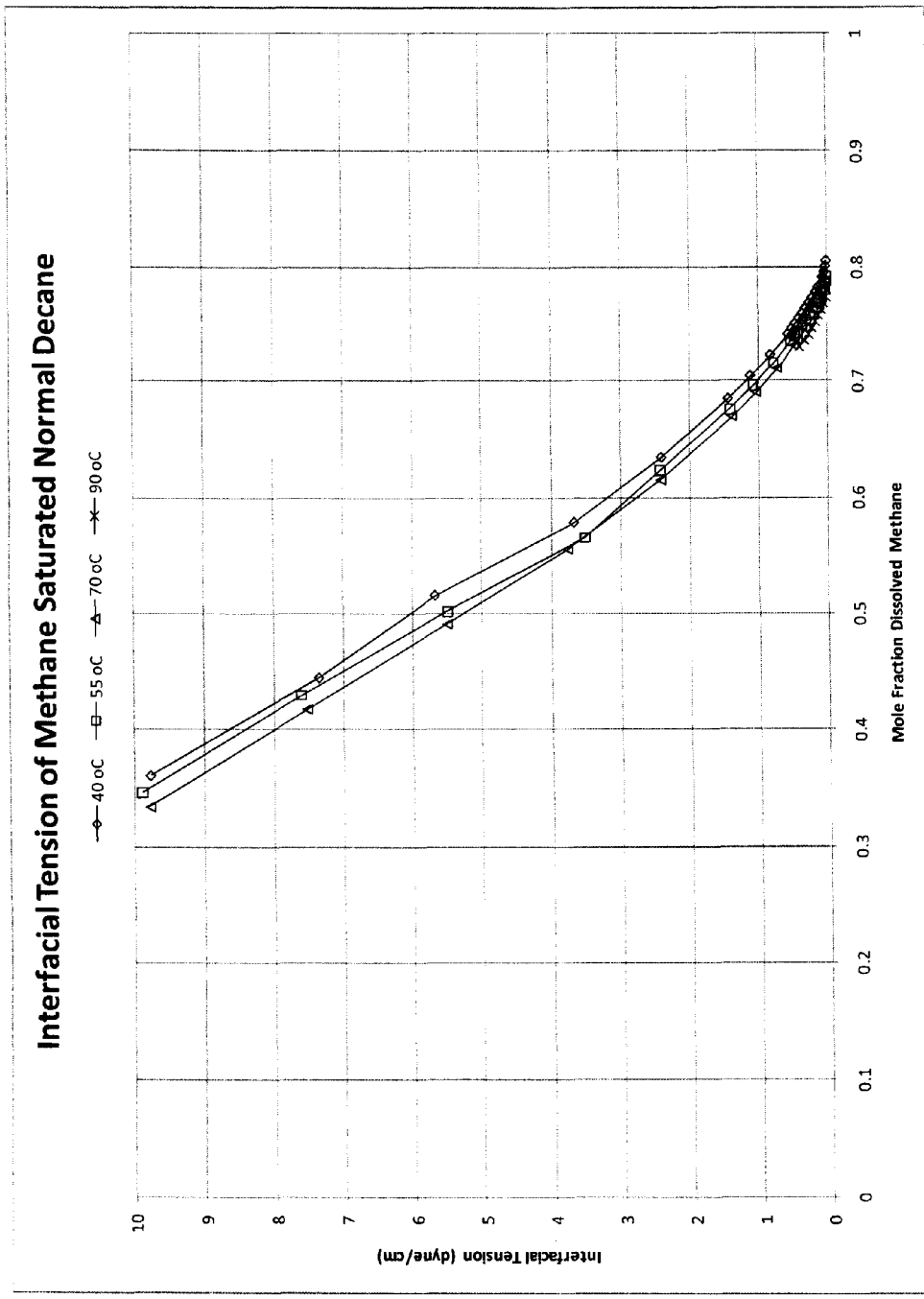
FIG. 8 is a graph illustrating the Interfacial Tension of Methane Saturated Normal Decane for different compositions of the fracturing fluid mixture.

Fracturing Fluid Mixture Having Selected Surface Tension During Fracturing Operation As illustrated in FIG. 8, laboratory testing with a like hydrocarbon liquid (n-decane) shows significant reductions in interfacial tension with increased dissolved gas. It is expected that a fracturing fluid mixture exhibiting a lower surface tension will result in a lower capillary pressure in the pores of the formation, thereby promoting improved rates of recovery of the well servicing fluid during draw down. Therefore, a fracturing fluid mixture can be prepared by selected the appropriate mole fraction of natural gas in the mixture to achieve a desired surface tension of the mixture during the fracturing process.

CONCLUSION

The preceding discussion relates to methods for creation of hydrocarbon fracturing fluid mixtures with selected properties such that the mixture has certain behaviours during a formation fracturing operation. For instance, the mixture can be created to produce a single-phase liquid state during fracturing conditions with gas evolution and reduction of the liquid proportion at reservoir and draw down conditions. Or, the mixture can be created to produce a two-phase hydrocarbon mixture during fracturing conditions to further reduce the liquid proportion at reservoir and drawdown conditions. Or, the mixture can be created to produce a single-phase gas state during fracturing conditions to eliminate or greatly reduce liquid placement in the reservoir. Or, the mixture can be created to produce a single-phase liquid state at reservoir conditions to permit long duration shut-in without dissipation of the applied gas. Or the mixture can be created to produce a viscosified hydrocarbon fracturing fluid by mixing of a viscosified hydrocarbon well servicing fluid with natural gas. Or, the mixture can be created to produce one or more of: an immediate gas phase, a large reduction in liquid volume, a reduced liquid viscosity and a reduced interfacial tension; this is theorized to result in reduced capillary pressures in the formation and result in a highly mobile liquid phase within the formation to promote quick recovery at even moderate drawdown pressures such as might be experienced deep within the fracture network.

Methodically combining hydrocarbon-based servicing fluids with natural gas creates a combined fluid mixture that provides desirable behaviours for hydraulic fracturing and subsequent production. These examples illustrate just some of the many possible natural gas and hydrocarbon well servicing fluid mixture compositions, pressure and temperature combinations, but are generally representative of behaviors that can be achieved at conditions when methodically applying mixtures of natural gas and hydrocarbon servicing fluids during hydraulic fracturing and subsequent recovery operations. As such, the natural gas content placed within the fracturing oil and the composition of the natural gas and fracturing oil components can be manipulated to create the desired behaviors during injection and subsequent recovery, such as:

- maintaining a single-phase liquid during injection while minimizing the liquid volume placed within the reservoir;
- maximizing creation of a gas phase within the pores, fissures and fractures; minimizing the hydrostatic within the recovered fluid column and retaining sufficient dissolved gas to maximize the mobility of the fracturing liquid; targeting the resulting liquid fraction or properties at reservoir conditions;
- maximizing creation of a gas phase within the pores, fissures and fractures;
- minimizing the hydrostatic within the recovered fluid column and retaining sufficient dissolved gas to maximize the mobility of the fracturing liquid; targeting a zero or negligible liquid fraction at reservoir conditions;
- achieving only a gas phase within the pores, fissures and fractures; and,
- minimizing the hydrostatic within the recovered fluid column and completely or substantially avoiding placement of fracturing liquids within the reservoir.

Further, the application of natural gas with a hydrocarbon well servicing fluid can be configured to deploy as a closed fracturing system eliminating water use without venting and flaring.

What is claimed is:

1. A method for fracturing a formation in a reservoir using a fracturing fluid mixture comprising natural gas and a base fluid, the method comprising:
   (a) determining certain reservoir conditions of the reservoir comprising the formation;
   (b) selecting a desired phase behavior of the fracturing fluid mixture during a fracturing operation in the formation under the determined reservoir conditions,
   (c) determining properties of the fracturing fluid mixture required to achieve the desired phase behavior, the determined properties including a composition of base fluid in the mixture and a mole fraction of natural gas in the mixture;
   (d) preparing the fracturing fluid mixture having the determined properties; and
   (e) injecting the fracturing fluid mixture into the reservoir under the determined reservoir conditions, such that the mixture exhibits the desired phase behavior during the fracturing operation.

2. The method as claimed in claim 1 wherein the reservoir conditions comprise: reservoir pressure, reservoir temperature, fracturing pressure, and recovery pressure.

3. The method as claimed in claim 2 wherein the determined properties of the fracturing fluid mixture further comprises injection pressure and injection temperature.

4. The method as claimed in claim 1 wherein the method further comprises determining a phase envelope of the fracturing fluid mixture having the selected mole fraction of natural gas in the mixture, and injecting the fracturing fluid mixture into the reservoir at a selected injection pressure and injection temperature such that the mixture comprises a liquid phase base fluid and a gaseous phase natural gas completely dissolved in the base fluid when the injected mixture enters the formation, and wherein at least some of the gaseous phase natural gas is not dissolved in the base fluid during recovery.

5. The method as claimed in claim 4 wherein the base fluid further comprises one or both of a proppant and a viscosifier.

6. The method as claimed in claim 4 wherein the mole fraction of natural gas in the mixture is between 4 mol % to 90 mol %.

7. The method as claimed in claim 4 wherein the injection pressure and injection temperature are selected so that the mixture is below the bubble point and above the dew point of the mixture when injected into the well.

8. The method as claimed in claim 4 wherein the injection pressure and injection temperature are selected so that the mixture is above the bubble and dew points of the mixture when injected into the well.

9. The method as claimed in claim 1 wherein the base fluid comprises a hydrocarbon well servicing fluid.

10. The method as claimed in claim 9 wherein the hydrocarbon well servicing fluid comprises one or both of alkane and aromatic based hydrocarbon liquids.

11. The method as claimed in claim 1 wherein the natural gas comprises methane or blends of methane with one or more gaseous hydrocarbons selected from the group consisting of ethane, propane, butane, and pentane, or blends of methane with one or more inert gases selected from the group consisting of carbon dioxide and nitrogen.

12. The method as claimed in claim 1 wherein the method further comprises determining a phase envelope of the fracturing fluid mixture having the selected mole fraction of natural gas in the mixture, and injecting the fracturing fluid mixture into the reservoir at a selected injection pressure and injection temperature such that the mixture comprises a liquid phase base fluid and a gaseous phase natural gas at least some of which is not dissolved in the base fluid when the injected mixture enters the formation and during recovery.

13. The method as claimed in claim 12 wherein the injection pressure and injection temperature are selected so that the mixture is below the bubble point and above the dew point of the mixture when injected into the well.

14. The method as claimed in claim 1 wherein the method further comprises determining a phase envelope of the fracturing fluid mixture having the selected mole fraction of natural gas in the mixture, and injecting the fracturing fluid mixture into the reservoir at a selected composition of base fluid in the mixture and mole fraction of natural gas in the mixture that the mixture comprises a gaseous phase natural gas and a liquid phase base fluid fully dissolved in the natural gas when the injected mixture enters the formation and during recovery.

15. The method as claimed in claim 14 wherein the mole fraction of natural gas in the mixture is between 80 mol % to 99 mol %.

16. The method as claimed in claim 14 wherein the composition of the base fluid in the mixture and the mole fraction of natural gas in the mixture are selected so that the mixture is above the critical temperature when the mixture is at reservoir conditions.

17. The method as claimed in claim 1 wherein the method further comprises determining a phase envelope of the fracturing fluid mixture having the selected mole fraction of natural gas in the mixture, and injecting the fracturing fluid mixture into the reservoir at a selected injection pressure and injection temperature such that the mixture comprises a liquid phase base fluid and a gaseous phase natural gas fully dissolved in the base fluid when the injected mixture enters the formation, equilibrates to reservoir conditions and until recovery.

18. The method as claimed in claim 17 further comprising after injection and before recovery, shutting in the well for a selected period of time.

19. A method for fracturing a formation in a reservoir using a fracturing fluid mixture comprising natural gas and a hydrocarbon-containing base fluid, the method comprising:
 (a) determining certain reservoir conditions of the reservoir comprising the formation;
 (b) selecting at least one desired behavior of the fracturing fluid mixture during a fracturing operation in the formation under the determined reservoir conditions, the desired behavior selected from the group consisting of phase behavior, interfacial tension, viscosity and dissolved natural gas content,
 (c) determining properties of the fracturing fluid mixture required to achieve the selected at least one behavior, the determined properties including a composition of a hydrocarbon-containing base fluid in the mixture and a mole fraction of natural gas in the mixture;
 (d) preparing the fracturing fluid mixture having the determined properties; and
 (e) injecting the fracturing fluid mixture into the reservoir under the determined reservoir conditions, such that the mixture exhibits the desired behavior during the fracturing operation.

20. The method as claimed in claim 19 wherein the selected desired behavior is viscosity, and the method further comprises determining the required mole fraction of natural gas in the mixture for a desired viscosity of the mixture during the fracturing operation.

21. The method as claimed in claim 19 wherein the selected desired behavior is surface tension, and the method further comprises determining the required mole fraction of natural gas in the mixture for a desired surface tension of the mixture during the fracturing operation.

22. The method as claimed in claim 19 wherein the selected desired behavior is dissolved gas content, and the method further comprises determining the required mole fraction of natural gas in the mixture for a desired dissolved gas content of the mixture during the fracturing operation.

\* \* \* \* \*